2,996,428
PROCESS FOR THE MANUFACTURE OF ACTH BY CMC CHROMATOGRAPHY
Evert de Jager, Oss, Netherlands, assignor to Organon Inc., West Orange, N.J., a corporation of New Jersey
No Drawing. Filed Nov. 19, 1959, Ser. No. 854,001
Claims priority, application Netherlands Dec. 9, 1958
3 Claims. (Cl. 167—74)

This invention provides a process for the manufacture of preparations of the adrenocorticotropic hormone.

In the British patent specification 804,639 a process is described for the purification of ACTH-preparations, in which ACTH is adsorbed on carboxy methyl cellulose, after which elution takes place with a liquid that has a pH-value different from the liquid from which the ACTH was adsorbed.

With the process described in the above specification high yields of ACTH-preparations of high activity can be obtained.

The ACTH-preparations obtained in this manner and in other manners known to the art do not consist of one single component, but of a mixture of various components. As a result of the presence of certain non-ACTH-like components in these preparations, the known ACTH-preparations are not useful in all patients, since a small number of patients are hypersensitive to the presence of these components. In addition it is assumed that a number of patients become refractory to this ACTH-therapy owing to the presence of these components.

The art has therefore sought for the preparation of ACTH-preparations from which the non-ACTH-like fractions have been removed. This does not mean that, as is the case with insulin, one single pure compound is obtained, for it has appeared from the investigation of Shepherd et al., see J. A. Chem. Soc. 78, 5051 (1958), that the corticotropic activity of ACTH-preparations is caused by a group of related, but yet chemically different peptides.

Now a process was found for the manufacture of ACTH-preparations having a higher purity than the present commercial preparations and containing only pure components with ACTH activity which process can be carried out on industrial scale in a simple manner; it gives favorable yields and is an improvement of the process of the abovementioned British patent differing from said process in that the elution is carried out stepwise with various elution liquids.

By application of this process a number of fractions are obtained having a larger or smaller ACTH-activity dependent on the elution agent used. By separating in a known manner the active substance from the most active fractions a highly active product is obtained freed to a very considerable extent from undesired factors, notably from inactive proteins.

In the present process preferably volatile buffer systems are applied in the elution because with these systems fractions are obtained from which the active substance can be separated in a simple manner, notably by lyophilization.

A system which in practice has turned out to be very suitable is the system pyridine-acetic acid.

A very good purification is obtained by using pyridine-acetic acid buffers of pH 5.2, which are 0.2 and 0.5 molar of acetic acid; the fraction with pure ACTH-components then comes in the buffer solution which is 0.5 molar.

Although it is indicated in the above-mentioned British patent that the elution takes place at a pH differing from that of the adsorption, it is also possible to elute with a liquid of a pH equal to that of the adsorption. In that case it is to be preferred, on industrial application, that the elution liquid has a molarity different from the liquid from which the adsorption has taken place.

The following examples illustrate the invention. It is self-evident that the invention is not restricted to the processes of these examples. It is quite possible to obtain comparable results with systems other than those mentioned.

*Example I*

25 g. of an ACTH-preparation, obtained by extraction of hog pituitaries with acid aqueous acetone, are dissolved in 2.5 litres of distilled water. The pH of the solution is adjusted to a value of 2.8 with 0.1 N NaOH. Subsequently 5 g. of CMC having a degree of substitution of 0.4 are added to the solution. After stirring for 24 hours the CMC with the protein adsorbed thereon is separated by centrifugation and transferred to a chromatography column, after which elution is successively carried out with pyridine acetic acid buffers of pH 5.2 which are 0.2, 0.5 and 1.0 molar of acetic acid. The eluates obtained in this manner are lyophilized. The fractions that are eluted with the former and the latter buffer and weight 121 mg. and 163 mg. respectively, contain only low active corticotropic factors. The fraction eluted with the buffer which is 0.5 molar of acetic acid and weighs 783 mg., exclusively contains highly active corticotropic factors. When the latter product is analyzed according to the method of Shepherd et al. (J. Am. Chem. Soc. 78, 5051 (1958)), by means of counter current distribution in the system n-butanol, 0.5% trichloro acetic acid, only components will be found having a K-value exceeding 1.

*Example II*

100 mg. of an ACTH-preparation obtained in the manner of Example I of the British Patent 804,639 are dissolved in 2.5 ml. of 0.1 N acetic acid. The thus obtained solution is sucked into a chromatography column which has been formed from 5 g. of CMC having a substitution degree of 0.2. The column is washed with 0.1 N acetic acid to remove biologically inactive protein fractions. Then the column is eluted successively with pyridine-acetic acid buffers of pH 4.7 which are 0.3 and 0.8 molar of acetic acid. The eluate obtained with the last buffer is lyophilized to obtain 61 mg. of a preparation containing more than 130 subcutaneous Sayers units per mg.

A purification effect of the same order of magnitude as mentioned in this example is obtained when, instead of the said buffer solutions, the following combinations are used: collidine-formic acid, pH 4.7 with molarity of acid 0.25 and 0.75; trimethyl amine-acetic acid, pH 4.7 with molarity of acid 0.30 and 0.80; triethyl amine-acetic acid, pH 5.8 with molarity of acid 0.15 and 0.35.

*Example III*

1,000 g. of an ACTH-preparation of a potency of 2.2 u./mg. are dissolved in 100 litres of water, after which the pH is adjusted to 3.5 with a little NaOH. To the thus obtained solution 200 g. of CMC having a substitution degree of 0.4 are added. After stirring for 24 hours the CMC is left to settle, after which the supernatant clear solution is siphoned off. Then the CMC is collected by centrifugation and washed with water of pH 3.5, after which the washed precipitate is transferred to a chromatography column. Elution is carried out successively with pyridine-acetic acid buffers of pH 5.2 which are 0.2, 0.5 and 1.0 molar of acetic acid. The eluates are collected separately and lyophilized.

The lyophilized eluate (35 grams), obtained by elution with the buffer which is 0.5 molar of acetic acid, contains the pure corticotropic fractions. When a sample hereof is analyzed according to the method of Dixon and Stack Dunne (Bioch. J. 61, 483 (1955)), only the corticotropic fractions $A_1$, $A_2$ and $A_3$ will be found in it. It is slated in passing that with the method of Dixon and Stack Dunne which is unsuitable for application on an industrial scale, artificial resins are used as adsorbents.

*Example IV*

40 g. of an ACTH-preparation of an activity of 15 u./mg. are dissolved in 24 litres of water. The pH is adjusted to 4.5 with 1 N NaOH. Subsequently 60 g. of CMC of a substitution degree of 0.2 are added. After stirring for 24 hours the CMC is separated by centrifugation, after which the elution is carried out with pyridine-acetic acid buffers of pH 4.5 which are 0.3, 0.9 and 1.2 molars of acetic acid. The fraction obtained with the buffer which is 0.9 molar of acetic acid contains the highly active corticotropic factors. On paper electrophoreses according to Dixon and Stack Dunne (see Bioch. J. 61, 483 (1955)), no indications are found in this fraction for the presence of the fraction $A_4$.

I claim:

1. In the process for the purification of adrenocorticotropic hormone preparations by means of adsorption on carboxymethyl cellulose, the fractionation step comprising subsequent eluting of the adsorbate with at least two volatile buffer systems of different molarity both different from the system from which the ACTH is adsorbed.

2. Process according to claim 1, in which pyridine-acetic acid buffers are used for the elution.

3. Process according to claim 2, in which two pyridine-acetic acid buffers of pH 5.2 are used which are 0.2 and 0.5 molar of acetic acid, after which the ACTH is isolated from the fraction which is eluted with the buffer which is 0.5 molar of acetic acid.

References Cited in the file of this patent

UNITED STATES PATENTS

| | | |
|---|---|---|
| 2,669,536 | Bunding | Feb. 16, 1954 |
| 2,805,976 | Bunding | Sept. 10, 1957 |
| 2,843,524 | Bunding | July 15, 1958 |
| 2,906,667 | McKerns | Sept. 29, 1959 |

FOREIGN PATENTS

| | | |
|---|---|---|
| 804,639 | Great Britain | Nov. 19, 1958 |

OTHER REFERENCES

Block et al.: Paper Chromatography and Paper Electrophoresis, Academic Press, N.Y., 1955, pages 139–140.